United States Patent [19]

Cavdek

[11] Patent Number: 4,747,212

[45] Date of Patent: May 31, 1988

[54] PLASTIC PIPE CUTTER

[76] Inventor: Richard S. Cavdek, 8936 Foothill Blvd., Sunland, Calif. 91040

[21] Appl. No.: 810,701

[22] Filed: Dec. 19, 1985

[51] Int. Cl.[4] ...................... B23D 21/06; B26B 27/00; B26D 3/16

[52] U.S. Cl. ........................................... 30/92; 30/96; 30/228; 30/241; 30/272 R; 30/374; 30/514

[58] Field of Search ................... 83/54, 631, 580, 694, 83/697; 30/124, 92, 272 R, 272 A, 241, 228, 96, 374, 392, 342, 514

[56] References Cited

U.S. PATENT DOCUMENTS

| | | | |
|---|---|---|---|
| 1,651,823 | 12/1927 | Kelleher | 30/228 X |
| 2,318,982 | 5/1943 | Wilhide | 30/228 |
| 2,517,362 | 8/1950 | Thompson | 83/694 |
| 2,548,411 | 4/1951 | Vacha | 408/20 |
| 2,716,813 | 8/1953 | Smyres | 30/228 |
| 3,024,530 | 3/1962 | Haskell et al. | 30/92 |
| 3,174,375 | 3/1965 | Westra | 83/631 X |
| 3,199,193 | 8/1965 | Norty | 30/241 X |
| 3,608,194 | 9/1971 | Miller | 30/94 |
| 3,636,629 | 1/1972 | Baun | 30/94 |
| 3,711,946 | 1/1973 | Troutman | 30/276 X |
| 3,748,933 | 7/1973 | DeShazor | 82/4 |
| 3,771,546 | 11/1973 | Roos | 137/318 |
| 3,861,035 | 1/1975 | Ramey | 30/92 |
| 3,870,431 | 3/1975 | Luckenbill et al. | 408/111 |
| 3,999,292 | 12/1976 | Breeze | 30/105 |
| 4,057,357 | 11/1977 | Daghe et al. | 408/67 |
| 4,091,533 | 5/1978 | Soumell | 30/95 |
| 4,114,485 | 9/1978 | Coblitz et al. | 82/4 |
| 4,177,558 | 12/1979 | Brown | 30/103 |
| 4,270,269 | 6/1981 | Weil et al. | 30/102 |

FOREIGN PATENT DOCUMENTS

| | | | |
|---|---|---|---|
| 564148 | 7/1977 | U.S.S.R. | 30/272 A |

*Primary Examiner*—E. R. Kazenske
*Assistant Examiner*—Scott A. Smith
*Attorney, Agent, or Firm*—John E. Wagner

[57] ABSTRACT

A cutting device for plastic pipe for use principally in the aid of plumbing, swimming pool and spa installations. The pipe cutter is designed specifically to be used or attached to a hand held drill motor of the type which tradesmen commonly carry and use for drilling holes and setting screws. The pipe cutter includes a body which is attachable to the front of a drill motor and houses a dual directional linear actuator such as an epicyclic ball screw with bi-directional brake. The epicyclic ball screw linear actuator responds to the chuck or rotating shaft of the drill motor. The housing defines or holds a U shaped recess or cradle for receiving a plastic pipe extending transverse to the length of the housing or more particularly on center or to the axis of the drill motor shaft. A guillotine type of cutter blade is driven by the screw actuator to move through a slot into the cradle to be driven through the side wall of the pipe and therefore sever the pipe within the cradle. Upon completion of travel of the guillotine blade through the U shape holder and severance of the pipe, the guillotine blade is returned to its at rest position outside of the U shaped holder. Both mechanical limits and electrical limit switches on movement of the guillotine blade are disclosed. This invention is disclosed as an attachment to a conventional drill motor, as an integrated pipe cutter, and as a bench top model.

8 Claims, 4 Drawing Sheets

FIG. 1
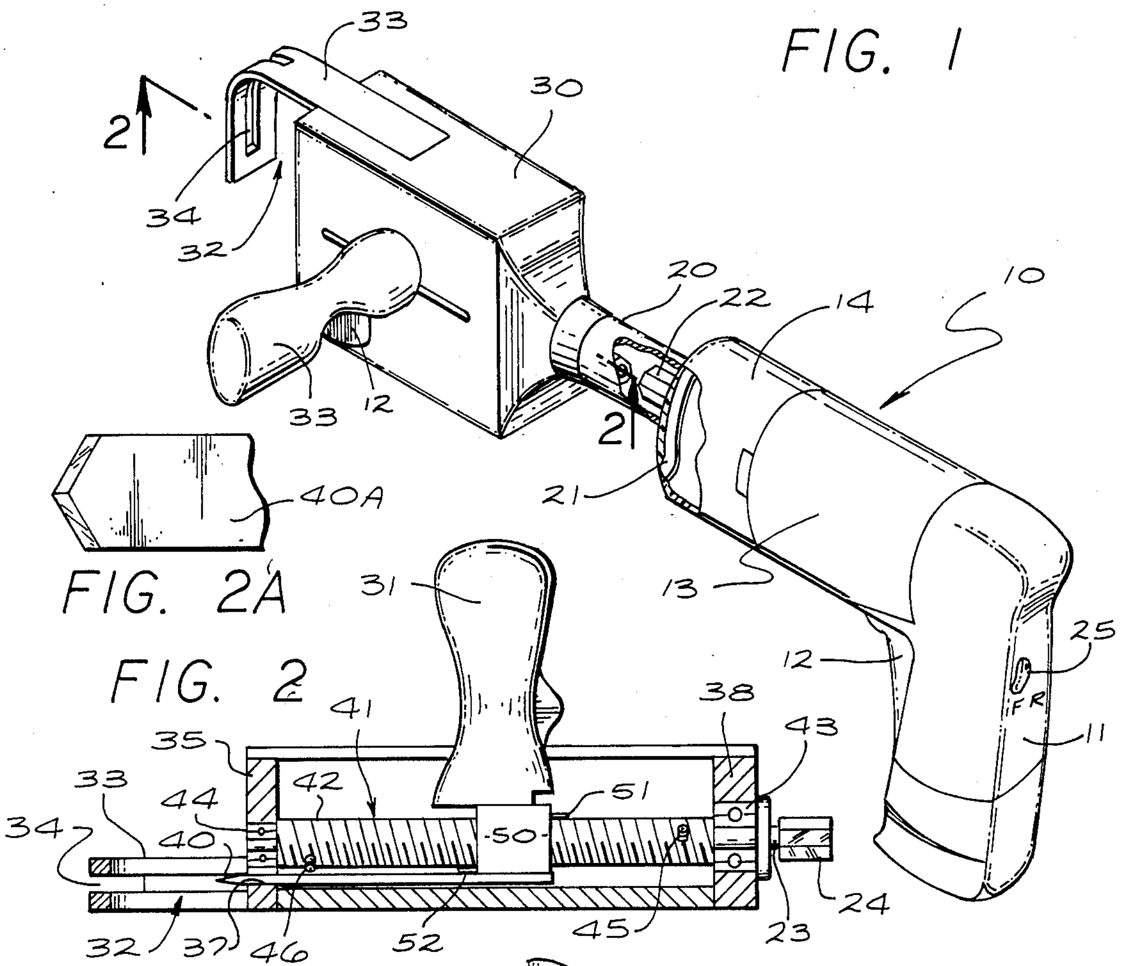
FIG. 2A
FIG. 2
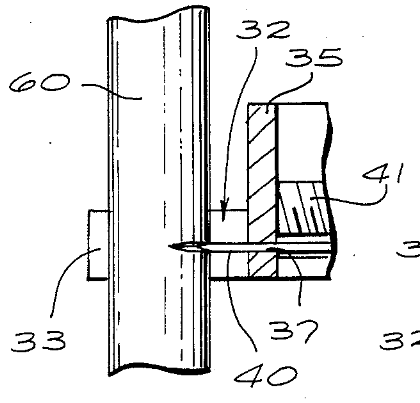
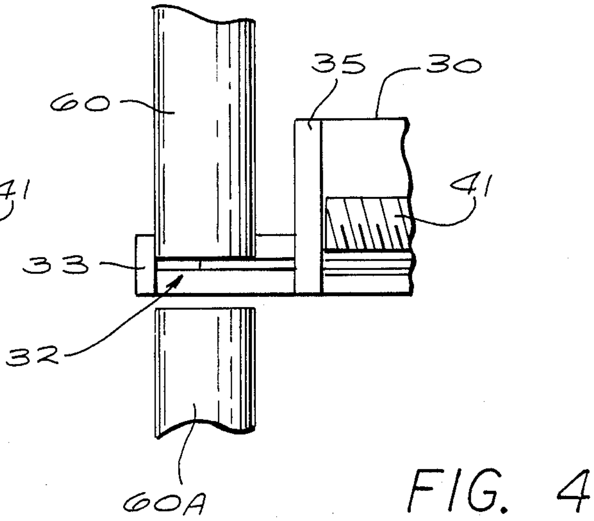
FIG. 3
FIG. 4

FIG. 5
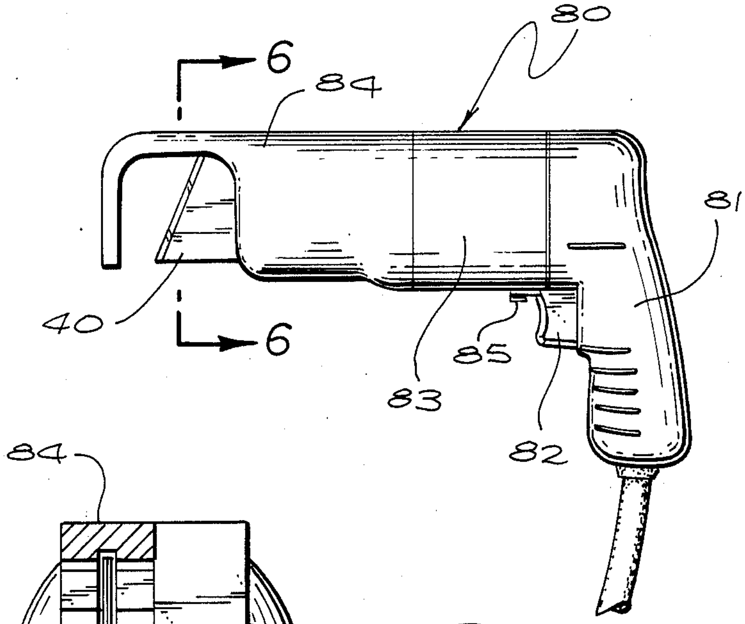
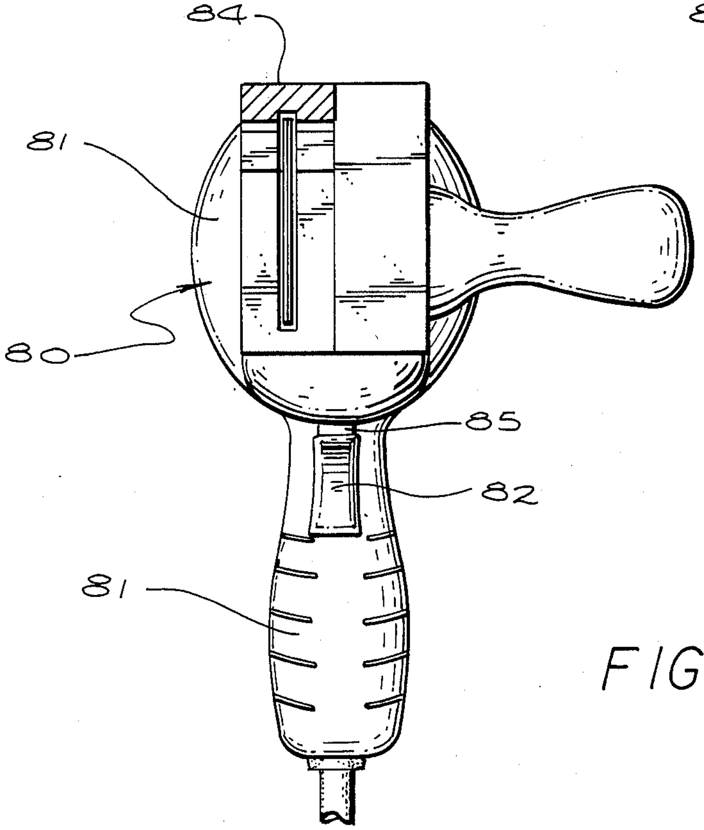
FIG. 6

PLASTIC PIPE CUTTER

BACKGROUND OF THE INVENTION

For many years the use of plastic pipe in various plumbing applications and particularly in the installation of pools and spas has become commonplace. Plumbers and pool and spa installers cut thousands of lengths of pipe each day. The traditional way of cutting the plastic pipe, apparently because of its relatively soft nature, as compared with galvanized or copper pipe, is to merely use a hacksaw. Several quick strokes through the plastic pipe produces a cut. The hacksaw cut, similar to the hacksaw cuts in metal, produces a rough end surface which may or may not be normal to the length of the pipe and most significantly, includes burrs both inside and outside the pipe. These burrs must be removed in order to get a good joint and to avoid contamination of the system. Some plumbers and installers use a reamer of the type commonly used to deburr the interior of copper and galvanized pipe. Since plastic doesn't require a sharpened tool, sometimes deburring is accomplished merely by wiping the end of the cut with a cloth. This method of deburring is usually effective to remove the burrs, but often they fall into the pipe. Some plumbers and installers merely deburr using their hand by inserting a finger or fingers in the pipe and wiping the interior surface and by holding the end of the pipe in the palm of the hand and making a wiping motion. Many plumbers and installers can prove the use of this method of burr removal by the callus and cut scars present on their fingers and hands from the sometimes sharp plastic burrs.

Some types of pipe cutters have been evolved for plastic pipe similar to the rotating chopper pipe cutter which includes a number of equally spaced cutter wheels and a clamp member for tightening one of the two wheels. Such a cutter is illustrated in U.S. Pat. No. 4,114,485. Cutters of this type are merely manual, require two rotary motions in addition to a clamping and unclamping action. The movable cutter wheel must be tightened into engagement with the outer surface of the pipe, the entire assembly rotated around the pipe numerous turns with the cutting wheels bearing into the exterior of the pipe, the movable cutting wheel tightened further against the new groove present in the pipe and the process of rotation of the entire cutter around the pipe repeated until the pipe is cut through. This type of cutter has no advantage and usually has a bell mouth or lip and may not produce an interior burr but often produces an interior sharp edge, which if attempted to be deburred can provide mean cuts. This type of cutter is slower than one would like and requires significant clearance around the pipe and deburring or filing of the lip before insuring a good joint. Its use, therefore, is confined to new, unused pipe, and in most caes, cannot be used for cutting through an existing installation which is close to any wall or other surface.

Other types of plastic pipe cutters are illustrated in the following U.S. Pat. Nos.:

4,091,533
3,999,292
4,270,269
3,771,546
3,748,933
3,608,194
3,636,629
4,057,357

None of these fill my needs.

BRIEF DESCRIPTION OF THE INVENTION

I have worked for a number of years installing pool and spa equipment and on a daily basis face the problem of cutting plastic pipe and deburring it. I was not satisfied with the existing method of cutting equipment and undertook to see if a truly effective, rapid, reliable, safe plastic pipe cutter could be produced.

I determined that virtually every artisan including plumbers, pool and spa installers, carry at least one drill motor used for drilling and related tasks. I felt that if it is possible to use the existing drill motor with its handle, switch and drive motor, that these would constitute three of the basic elements needed for an electrically operated plastic pipe cutter.

What I felt I needed was a cutter without a saw type blade and one which did not produce any burrs or dust, and one which would smoothly cut the plastic pipe accurately and leave no burr either inside or outside the pipe. I determined this could be accomplished if the rotating drive shaft of the drill motor were converted to a linear movement and an effective linear moving cutting blade assembly could be developed.

I have accomplished each of these objectives in a plastic pipe cutter including a body which is dimensioned and includes fixtures for engaging the body of the drill motor with a ball screw drive engaging the drill motor shaft. A ball nut with internal threads engaging the exterior threads of the ball shaft is positioned for axial movement within the housing responsive to drill motor operation and rotation of the screw shaft.

Coupled to the back side of the ball nut is the rear face of a guillotine type cutter blade which preferably has a point centermost or may be angularly shaped like the conventional French guillotine blade. The guillotine blade extends through a slot in the portion of the housing which defines a generally U shaped recess for receiving the pipe to be cut transverse to the axis of rotation of the drill motor shaft. The cradle receiving portion of the housing includes a recess or sufficient clearance at the second leg of the U shaped recess to allow the guillotine blade to pass completely through the plastic pipe.

My invention includes a pair of travel limiting devices which are effective to the stop the blade movement at full retraction out of the cradle opening and at full extension through the cradle recess at the completion of a cut. In one embodiment, the limiter is the epycyclic ball screw with pre-set stop pins which touch the ball nut fingers. This is the bi-directional brake. In another embodiment of my invention, the blade movement limiter is in the form of a pair of electrical limit switches which are located within the housing and are operated by movement of the actuator. In another embodiment of my invention, the blade movement limiter involves a third load responsive clutch in the mechanical drive system which disables further movement either in the extension or retraction direction at the end of intended travel.

In one embodiment of my invention, the device is an attachment to an existing drill motor. In another embodiment, it is fully integrated with the handle switch, electric motor, gear box and drive shaft, all within a single body. In still another embodiment, it is a part of a table top cutter unit.

BRIEF DESCRIPTION OF THE DRAWING

This invention may be more clearly understood from the following detailed description and by reference to the drawing in which:

FIG. 1 is a perspective view of a conventional drill motor with this invention attached and ready for cutting of the plastic pipe;

FIG. 2 is a horizontal sectional view of the cutter of this invention taken along lines 2—2 of FIG. 1 to show the interior components thereof;

FIG. 2A is a fragmentary side elevational view of one form of blade;

FIG. 3 is a fragmentary horizontal sectional view similar to FIG. 2 with the blade partly extended and of a partially cut pipe;

FIG. 4 is a fragmentary horizontal sectional view similar to FIG. 2 with the blade fully extended at the completion of a fully cut pipe;

FIG. 5 is a side elevational view of an alternate embodiment of this invention constituting a fully integrated motor-pipe cutter;

FIG. 6 is a vertical sectional view of the alternate embodiment of FIG. 5 taken along lines 6—6 of FIG. 5;

DETAILED DESCRIPTION OF THE INVENTION

Figure 7:
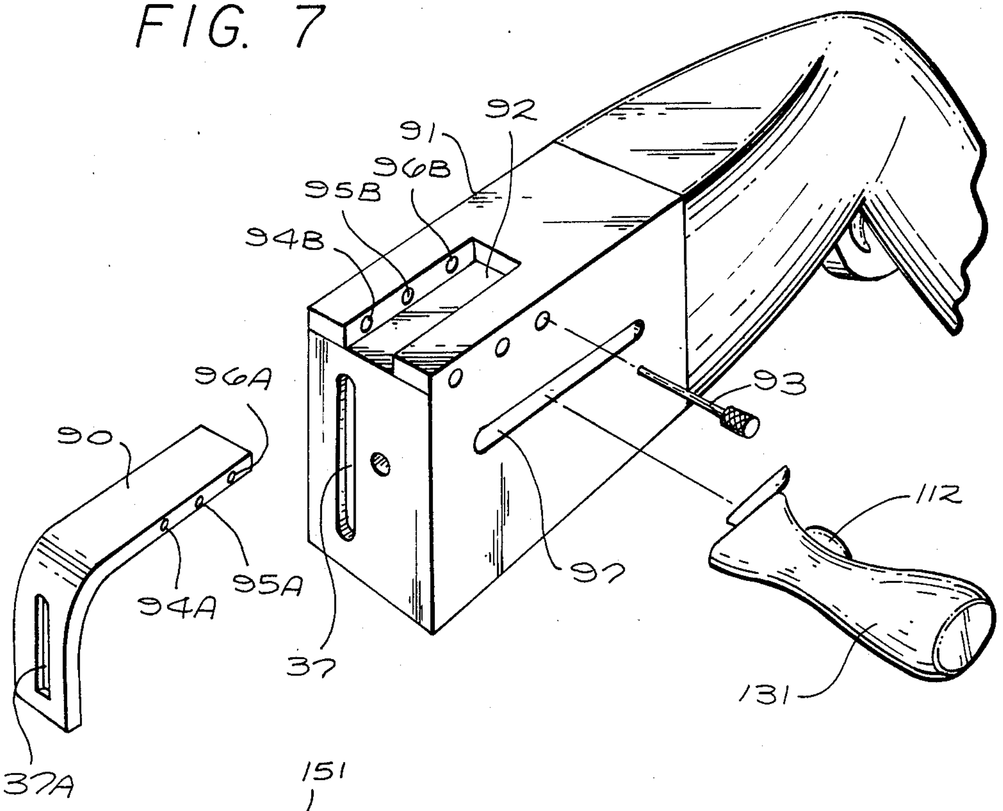
FIG. 7 is an exploded perspective view of another embodiment of this invention.

Now referring to FIG. 1, a hand drill 10 including a grip 11, trigger 12, body 13 containing a rotary electrical motor, unshown, and gear speed reducer assembly 14 constitute a conventional hand drill with its chuck removed. A hollow tube 20 is secured as by a clamp 21 to the speed reducer assembly 14. The driven shaft 22 of the drill 10 extends into tube 20 and is coupled to a shaft extension 23 of FIG. 2 by coupling 24.

The drill motor may be either a constant or variable speed type and may include a reversing switch 25 or may be a single direction drive drill providing an automatic reversing drive is used. I have used the following drill successfully with my invention: Milwaukee 0234-1 of Milwaukee Electric Tool Corp, Brookfield, Wis. 53005.

The tube 20 joins a housing 30 containing the cutter drive assembly of this invention. The housing 30 has a second stabilizing handle 31 used to aid in positioning the cutter and hold it in position while severing a pipe positioned within the cradle opening 32 at the front or outer end of the housing 30. An outer arm 33 defines the opening 32 with the housing 30. Arm 33 includes a slot 34 which is dimensioned to receive a guillotine type cutter blade 40, unshown in FIG. 1, but seen in FIGS. 2–4. The blade 40 on full extension enters slot 34 in order to completely sever a plastic pipe positioned in the cradle opening 32. The cradle 33 is manufactured of aluminum or steel and of thickness sufficient to sustain the load of a pipe pressing against it while being cut. I have found that 0.500 in thickness and type 6061 aluminum for the housing 30 and cradle 33 provides sufficient strength for a cutter designed to cut polyvinyl chloride (PVC), and ABS sewer pipe, Schedule 40, of 3 inch outside diameter and $\frac{1}{8}$ inch or $\frac{1}{4}$ inch wall thickness. For larger pipes, the cradle opening 32 will be larger than shown in the drawing, and cradle 33 of greater thickness.

Contained within the housing 30 is the preferred drive mechanism for this invention shown in FIGS. 2–4. It comprises a epicyclic ball screw 41 having an external helical track 42 which extends from a rear wall 38 to the front wall 35 of the housing 30. The ball screw 41 is journalled in bearings 43 at the rear and 44 at the front of housing 30 in respective walls 38 and 35. A pair of pins 45 and 46 extend out of ball screw 41 to act as stops for reversing the direction of movement of a ball nut 50 encircling the epicyclic ball screw 41 and including internal ball bearings, not shown, which engage the track 42. A pair of fingers or brakes 51 and 52 extend out of the ball nut 50 in position to engage respective pins 45 and 46 at the end of travel of ball nut 50 in either the forward (cutting) or rearward (releasing) directions. The assembly of ball screw 41, ball nut 50, pins 45 and 46 and fingers 51 and 52 both constitute a commercially available reversing drive known as epicyclic ball screw with bi-directional brake produced by Motion Systems Corporation of Shrewsbury, N.J., 07707, as their part 85206. The ball nut 50 moves forward responsive to rotation of ball screw 41 until the finger or brake 52 strikes pin 46 and then automatically free wheels on the still rotating shaft 41, and returns when switched in reverse. Finger 51 engages pin 45 and free wheels. As long as the trigger 12 is depressed, the ball nut 50 will cycle forward or rearward depending on drill switch forward or reverse.

Attached to ball nut 50 is blade 40 which extends through slot 37 in housing 30. The blade 40 is preferably manufactured of hardened steel and is from 0.170–0.190 inch thick. As shown in FIGS. 2–6, the blade 40 is angled in traditional guillotine shape with the point at one edge as illustrated particularly in FIG. 5. This form of blade is particularly useful in trapping the pipe to be cut within the cradle opening as illustrated in FIG. 5 to facilitate cutting. An alternate shape of blade 40 appears in FIG. 2A as spade shaped blade 40A. Using the linear drive mechanism as shown in FIG. 2, the blade of FIG. 2 and a drive motor producing 25 foot-pounds (at stall), a force of over 6000 pounds can be applied by the blade on the pipe.

The operation of this invention is best illustrated in FIG. 3 in which a plastic pipe 60 has been inserted in cradle opening 32 or arm 33 hooked around pipe 60. The drill motor has been energized and the blade 40 driven forward through the opening 37 in front wall 35 and penetrated into the wall of pipe 60. The highly localized pressure of the tip of blade 40 causes it to enter pipe 60 and smoothly cut the pipe 60 without burrs or rough edges. As the blade 40 continues through the pipe 60, it enters slot 34 in wall 33 and neatly severs the pipe section 60A. No chips are produced and the ends of both sections of pipe 60 are smooth and often provide a near polished appearance. The blade 40 automatically stops as described above and upon release of the trigger 12, operation of the F-R switch 25 to reverse and depression the trigger 12, returns to its concealed position within housing 30, at which time the trigger 12 is released and the cut is complete and the cutter ready to be stored until next use.

Now referring to FIGS. 5 and 6, an alternate embodiment of this invention is shown. In this case a fully integrated electric powered cutter 80 is shown. It is a dedicated tool and not an addition to a standard drill motor. It includes a handle 81, a trigger 82, body 83 and cutter assembly 84. The drive mechanism for blade 40 is contained within the housing 84. In this case, the blade 40 is driven outward and returned electrically by switching of reversing switch 85 shown in front of trigger 82. This embodiment includes a bi-directional brake or slip clutch (unshown) in the drive system to stop movement of blade 40 at its extremes of travel.

In certain cases, the cutter may be needed to cut a particular pipe size repeatedly and the universal cutters of FIG. 1 and 5 are undesirable. The embodiment of FIG. 7 illustrates an adjustable size cradle or cradle opening. In this embodiment, the arm 33 of FIGS. 1-4 is replaced with a removable cradle 90 which is adjustably secured to the body 91 of a blade drive housing. An adjustment slot 92 in the top of housing 91 allows cradle 90 to be moved forward or rearward to three different extension points, each one correct for a different size of pipe, e.g. 1½ inch, 2 inch and 3 inch outside diameters. One or two adjustment pins such as pin 93 extend through marked openings 94-96 to pass through corresponding holes 94A-96A in cradle 90 and into receiving openings 94B-96B to hold the cradle securely in place at the selected extension. Blade 40, retracted into the body 91 and unshown, is advanced by the internal drive mechanism through openings 37 and 37A to sever the pipe sections held in the cradle 90. Handle 131 is located on the side of body 91 and moves with the blade as is explained below.

Figure 8:
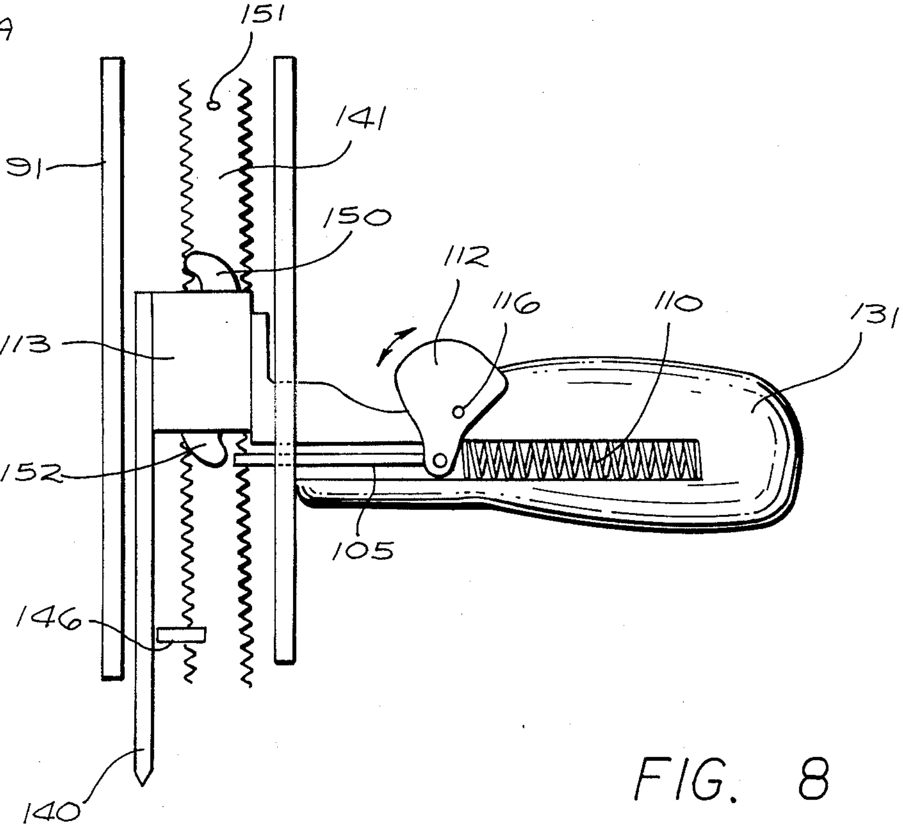
FIG. 8 is a horizontal sectional view of the safety switch feature of this invention taken along line 8—8 of FIG. 7.

In order to minimize the possibility of injury to a worker using my invention, I have provided a safety switch which is illustrated in FIG. 8. It requires that the primary trigger 12 of the cutter shown in FIG. 7 be depressed to power the cutter motor, and a second trigger 112 on the stabilizing handle 131 to be depressed for cutting operation.

Trigger 112 pivots about rod 106 to move shaft 105 to the right in the drawing against the opposition of spring 110 within the handle 131. Shaft 105 normally extends into the housing 91 through slot 97 of FIG. 7, and engages reversing finger 152 which constitutes the free wheel actuator or brake of the epicyclic ball nut preventing forward movement of the ball nut 113 carrying blade 140.

When trigger 112 is depressed, shaft 105 is withdrawn and the epicyclic actuator drive can operate normally with shaft 141 rotating, ball nut 113 advancing and carrying blade 140 until finger 152 strikes pin 146 whereupon the ball nut 113 advances no further and reverse movement is initiated by the epicyclic drive mechanism and the blade 140 returns until the finger 150 strikes the pin 151 and the ball nut 113 free wheels.

If at any time the operator releases trigger 12, the drive and blade stop. If the operator releases trigger 112, the drive free wheels and the blade does not move. If trigger 112 is again depressed, the blade 40 resumes its previous direction of movement. This requires both hands on the triggers 12 and 112 for cutting operation.

Figure 9:
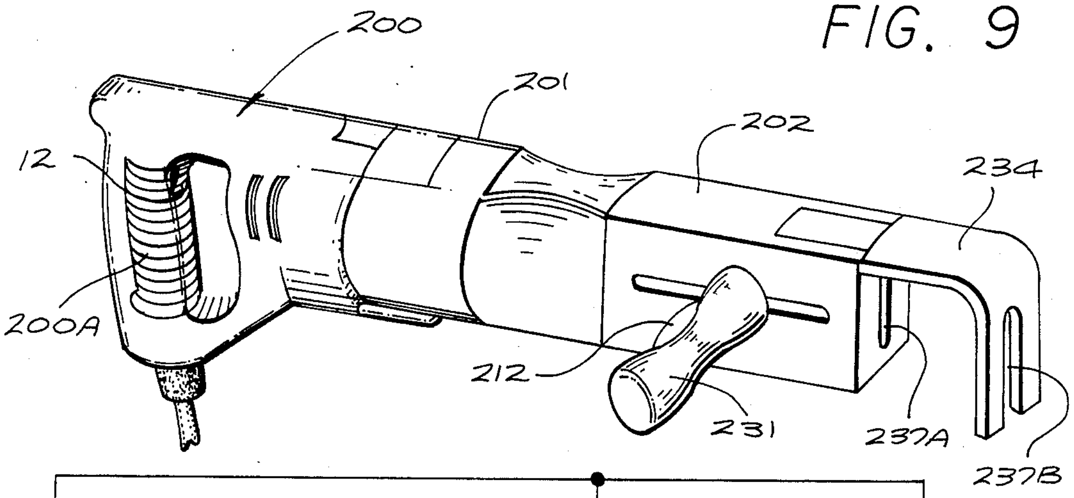
FIG. 9 is a perspective view of another hand held embodiment of this invention.

FIG. 9 illustrates an alternate embodiment integrated into a tee handle motor 200 with a speed reducing gear box 201 coupling the motor 200 to the housing 202 of this invention. The housing 202 includes a side slot 203 out of which handle 231 extends with its safety switch 212. An actuator of the type shown in FIGS. 2 or 8 is contained within housing 202. The blade (unshown) is retracted within housing 202 but extends outward under the power from the motor 200 through slots 237A and 237B to sever a pipe section held in cradle 234. The in-line arrangmeent of the motor with its handle 200A allows this embodiment to be used in close quarters.

Figure 10:
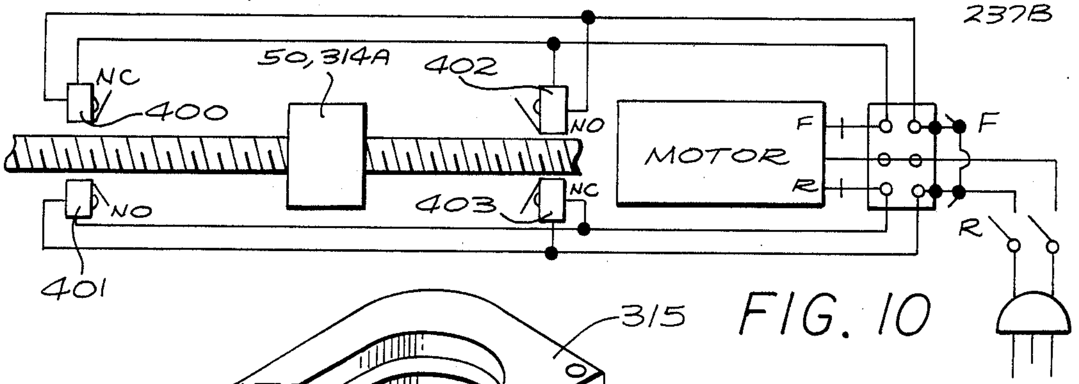
FIG. 10 is a perspective view of a bench top version of my invention.

Referring now to FIG. 10, a bench top cutter employing my inventive concept is shown. It employs a base 300 mounting a motor 301 and a starting capacitor 307 constituting the power source. The motor has a line cord 303 and a pair of switches, ON-OFF switch 304 and FORWARD-REVERSE switch 305.

The motor 301 dirves a shaft 306 via pulley 310, belt 311 and pulley 312, providing a speed reduction. The shaft 306 is journaled to bearing block 213. An epicyclic drive 314 similar to the drives of FIGS. 2 and 8 is positioned between the bearing block 313 and the U shaped cutter cradle 315, which also is secured to base 300. The blade 316 secured to the ball nut or 314A traveler for movement into the slot 320 of cradle 312. Pipe to be cut is inserted in the open mouth of the cradle for cutting. The switch 304 is energized and the knife 316 advances. At full cutting travel, the switch 305 may be operated to retract the blade. Microswitches may be installed at the inner faces of block 313 and cradle 315 to be operated by the ball nut 314 to open the motor power circuit at the end of travel in each direction. In such case a simple linear drive mechanism may be substituted for the linear drive of FIGS. 2 and 8.

Figure 11:
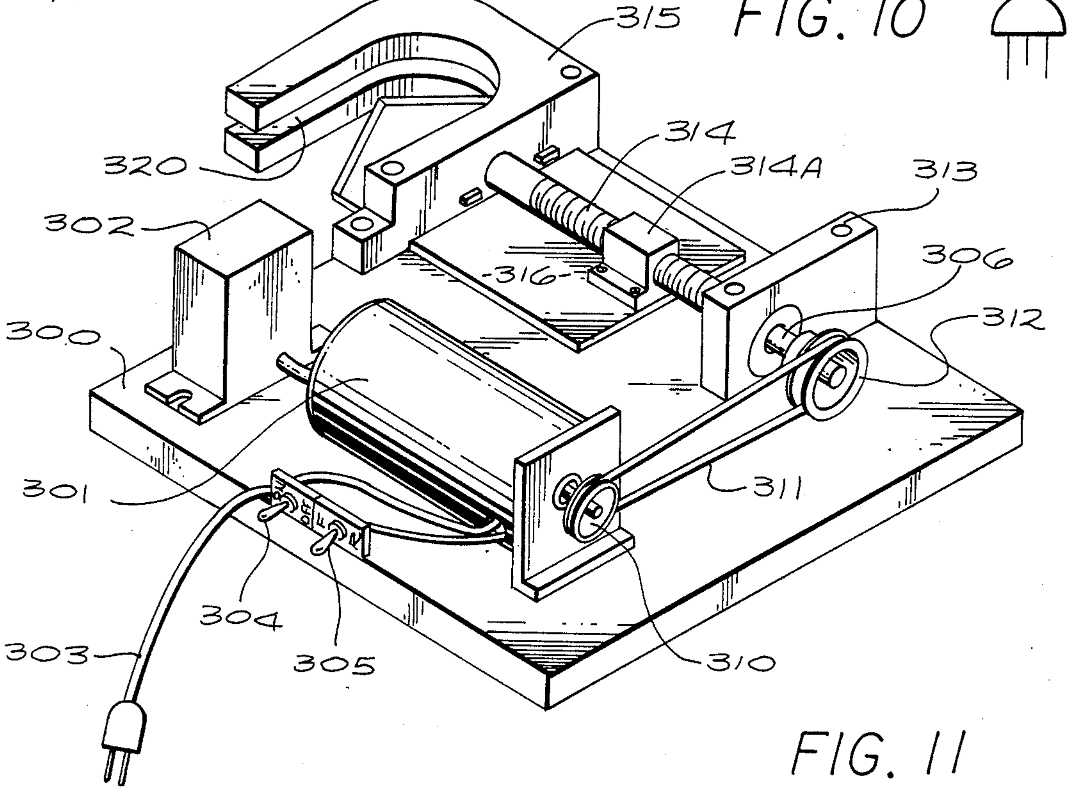
FIG. 11 is an electrical schematic diagram of an electrically controlled automatic limit switch system of this invention.

Now refer to FIG. 11 which shows the electrical schematic circuit suitable for operation of this invention. It employs the trigger switch 12 or 304 of FIGS. 2 and 10 respectively and a forward or reverse switch 25 or 305 of the same figures. The drive includes shaft 42 or 314 and traveler or ball nut 50 or 314A. Added to the system are four micro switches 400, 401, 402 and 403, located in pairs at opposite ends of the travel of traveler 50, 314A. When the trigger switch 12 or 304 is operated and the FWD-RVS switch 25 or 305 is in its forward selection position, the traveler 50, 314A moves forward until striking switches 400 and 401. Switch 400 is normally closed and switch 401 is normally open. The traveler striking switch 400 opens the forward drive circuit and will not allow its reactivation until the traveler 50, 314A moves back off of the switch 400. Switch 401 is normally open but closed by traveler 50, 314A at forward travel limit enabling the reverse switch 25, 305 as soon as the reversing switch 25, 305 is operated to the reverse position. Switches 402 and 403 are located at the rearward limit of travel, and each normally open and normally closed, respectively, each in parallel with their counterparts 400 and 401. Switches 400 and 402 are in the forward circuit and switches 401 and 403 are in the reverse circuit. The motor 10, 301 has its forward, common and reverse terminals connected to the same respective terminals of the F-R switch 25, 305.

On full return movement, switch 402 is closed enabling the forward circuit, and switch 403 is opened disabling the reverse circuit. Using these switches full forward and reverse, operation of the cutter is achieved.

The above described embodiments of the present invention are merely descriptive of its principles and are not to be considered limiting. The scope of the present invention instead shall be determined from the scope of the following claims including their equivalents.

What is claimed is:

1. A plastic pipe cutter comprising:

a hollow body;

an elongated screw drive member journaled for rotation within said body between opposite end walls thereof;

traveler means secured to said elongated screw drive member within said body to be driven linearly upon rotation of the elongated screw drive member;

means defining a cradle recess for receiving a length of pipe within said cradle and extending generally transverse to the length of said elongated screw drive member;

a blade coupled to said traveler for linear movement into and out of said circuit recess upon rotation of said elongated drive member; and means for driving said elongated screw drive member in two directions to advance said blade into the cradle recess and to retract said blade therefrom;

whereby a plastic pipe positioned within said cradle recess will be cut by said blade upon advance of said blade into the cradle recess and movement of said blade will be terminated at the end of travel with said traveler means remaining in free wheeling relationship with said elongated screwdrive means;

switching means engagable by said traveler means at each end of travel of said blade for terminating movement of said blade with said traveler means in engagement with said elongated screw drive member;

said switching means comprising a series of switches including a manually operated reversing switch and including a normally closed first switch at the outermost end of travel of said travel means in series with the forward travel contacts of said manually operating reversing switch;

a normally open second switch connected in parallel with said first switch and positioned to close responsive to end of travel in a retraction direction of said traveler means;

a normally open third switch in series with the reversing contacts of said manually operated reversing switch positioned to close responsive to end of cutting stroke travel of said traveler means; and a normally closed fourth switch in parallel with said third switch positioned to open in response to end of travel of said traveler means in a retraction direction;

whereby said apparatus will advance in a cutting mode when said manual switch is in a forward switched position until the travel means reaches the end of the cutting stroke whereupon further forward movement of said traveler means is disabled until said manually operated reversing switch is operated in a retraction direction.

2. The plastic pipe cutter in accordance with claim 1 wherein said body defines a handle and a mount for an actuating switch and contained within said body is a motor, a drive shaft of said motor, an actuating switch for operating said motor and electrical connections for applying power to said motor.

3. The plastic pipe cutter in accordance with claim 1 wherein said cradle is adjustable in size to accommodate varous sizes of pipe, each cradled for precise cutting;

said cradle comprising a curved slotted member including an elongated portion engaging said body; and a plurality of locking means for securing said cradle to said body adjacent to the blade carrying end thereof at a plurality of positions, each defining a different cradle size.

4. The plastic pipe cutter in accordance with claim 1 wherein said elongated drive member and said traveler comprise an epicyclic screw drive and ball nut assembly.

5. The plastic pipe cutter in accordance with claim 1 including a first power switch for electrically powering said drive means arranged to be operated by one hand of the operator and a second power switch spaced from said first power switch to be operated by the operator's other hand, both of said power switches located remote from said cradle recess and both required to be operated to produce pipe cutting operation;

said second power switch engaging said epicyclic screw drive and ball nut assembly automatic reversing means for retracting said blade whenever said second power switch is not operated.

6. The plastic pipe cutter in accordance with claim 5 wherein said second power switch is located on an auxiliary side handle secured to said plastic pipe cutter.

7. The plastic pipe cutter in accordance with claim 6 wherein said auxiliary side handle is secured to said traveler means and moves therewith.

8. The plastic pipe cutter in accordance with claim 7 wherein said auxiliary side handle includes plunger means coupled to said second power switch and engaging the reversing means of said epicyclic screw drive and ball drive assembly to reverse the direction of movement of said traveler means whenever said second power switch is not operated.

* * * * *

UNITED STATES PATENT AND TRADEMARK OFFICE
CERTIFICATE OF CORRECTION

PATENT NO. : 4,747,212

DATED : May 31, 1988

INVENTOR(S) : Richard S. Cavdek

It is certified that error appears in the above-identified patent and that said Letters Patent is hereby corrected as shown below:

Column 6, line 7: change "arrangmeent" to "arrangment"

Column 8, line 14: change "varous" to "various"

Signed and Sealed this

Sixth Day of September, 1988

*Attest:*

DONALD J. QUIGG

*Attesting Officer*

*Commissioner of Patents and Trademarks*